Sept. 14, 1926.
A. C. MENGES
TRACK FOR TURNTABLE STRUCTURES
Filed Jan. 2, 1926
1,600,122
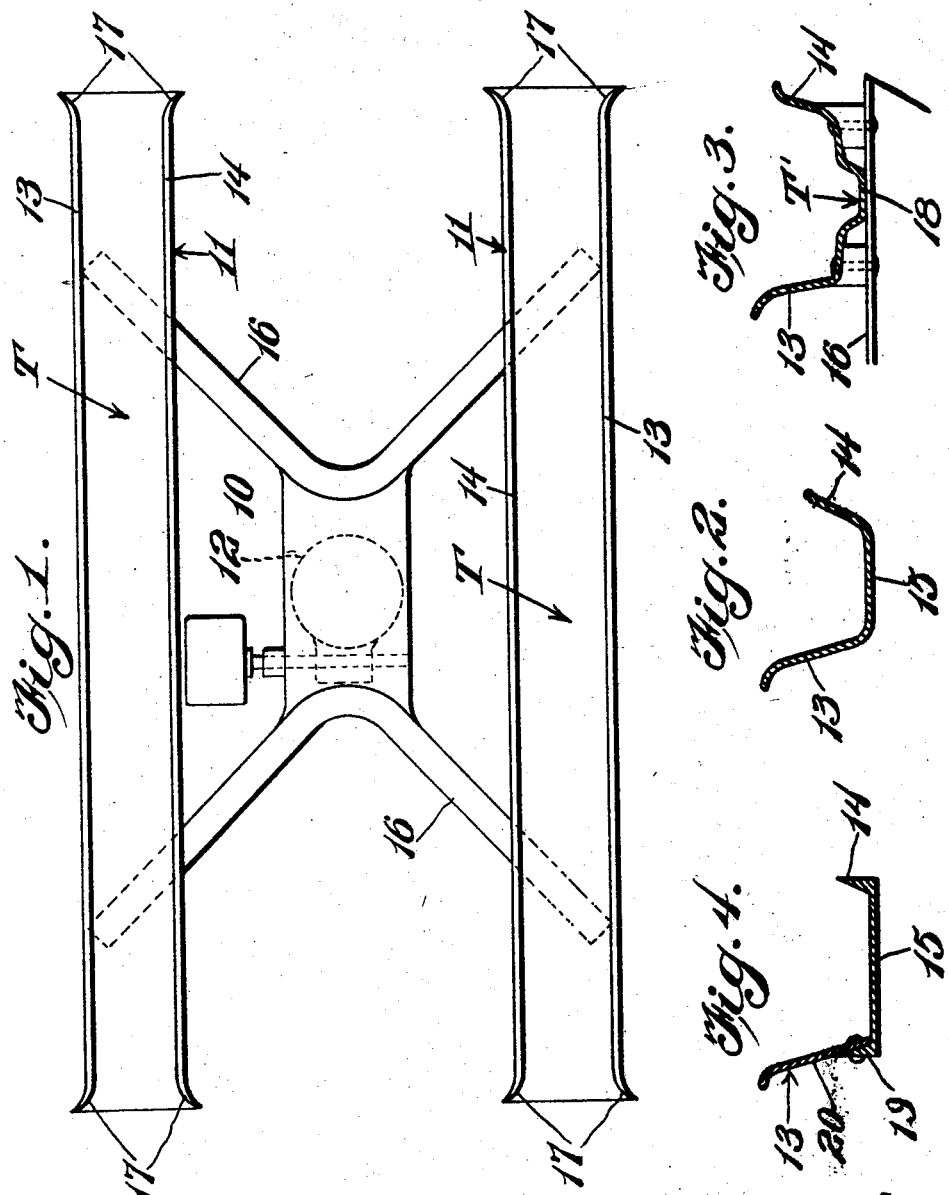

Patented Sept. 14, 1926.

1,600,122

UNITED STATES PATENT OFFICE.

ALBERT C. MENGES, OF MEMPHIS, TENNESSEE.

TRACK FOR TURNTABLE STRUCTURES.

Application filed January 2, 1926. Serial No. 79,051.

This invention relates to tracks for turntable structures and more particularly to the construction and arrangement of the tracks of automobile hoists.

An important object of the invention is to provide a device of this character which will afford an efficient guide for the wheels of the automobile and which, while actually only providing a guide of sufficient width to properly accommodate the wheels of the vehicle, presents an appearance of sufficient width to lend confidence to the driver of the vehicle.

A further object of the invention is to so construct the tracks that damage to the wheels of the vehicle in entering or leaving the structure is prevented.

A still further object of the invention is to provide a device of this character which leaves exposed to the workman a major portion of the wheel of the vehicle.

These and other objects I attain by the construction shown in the accompanying drawing, wherein for the purpose of illustration is shown a preferred embodiment of my invention and wherein:—

Figure 1 is a plan view of an automobile hoist embodying tracks constructed in accordance with my invention;

Figures 2, 3 and 4 are sectional views illustrating the methods of constructing the track.

Referring now more particularly to the drawing, the numeral 10 generally designates a vehicle supporting structure including spaced parallel tracks 11. The structure 10 may have associated therewith any suitable hoisting mechanism, generally indicated at 12.

The tracks 11 are each in the form of a trough T substantially J-shaped in cross section, the long and short arms 13 and 14 of the J diverging from one another having their upper ends out-turned. The bight portion 15 is adapted to seat upon supports 16 included in the structure 10 to be secured thereto. At opposite ends of the trough T, the side walls of the arms 14 and 13 flare outwardly, as indicated at 17, to provide a relatively wide guiding mouth for directing a wheel of the vehicle into the trough provided between the arms. This trough may be produced in any one of a number of ways. In Figure 2, the structure is shown as having been formed from a single strip of material having the bight portion 15 thereof flat for the reception of the vehicle wheels. In Figure 3, a structure similar to that shown in Figure 2, is illustrated with the exception of the fact that the bottom of the bight 15 is centrally depressed, as at 18, to provide a central supplemental trough T' which will assist in maintaining the vehicle wheel at the center of the track. It will, of course, be understood that the track must be made of sufficient width to accommodate the larger sizes of vehicle tires and that accordingly the wheels of smaller tired vehicles when positioned in the trough would be capable of transverse movement therein. This transverse movement is prevented by the supplementary trough structure. In Figure 3, I have illustrated the structure built up from a U beam, one of the arms of which forms the short arm 14 of the J while the other of the arms 19 thereof provides a means for attaching a plate 20 forming the long arm 13 of the J. The body or web of the U beam will, of course, provide the bight 15.

It is further seen that the forms here shown add greater strength to support the vehicle when in a position clear of the ground as the cantilever effect would be far greater if the trackways were not of those shapes. With such shapes to offset the cantilever effect, a greater space is allowed between trackways for workmen, as many braces are eliminated.

Since the construction hereinbefore set forth is obviously capable of a certain range of change and modification without materially departing from the spirit of the invention, I do not limit myself to such specific structure except as hereinafter claimed.

I claim:—

1. A combined jack and turntable for vehicles, the structure including vehicle receiving tracks each substantially J-shaped in cross section, the shorter arms of the track structure being arranged at corresponding sides of the tracks, the bight portion of the track having a depression forming a longitudinally extending centrally located groove.

2. A combined jack and turntable for vehicles, the structure including vehicle receiving tracks each substantially J-shaped in cross section, the shorter arms of the track structure being arranged at corresponding sides of the tracks, the bight portion of the track having a depression forming a longitudinally extending centrally located groove, the arms at the ends of the tracks diverging from one another.

In testimony whereof I hereunto affix my signature.

ALBERT C. MENGES.